US010392995B2

(12) United States Patent
Maguin

(10) Patent No.: US 10,392,995 B2
(45) Date of Patent: Aug. 27, 2019

(54) LIQUID PURIFICATION ELEMENT

(71) Applicant: CONTINENTAL AUTOMOTIVE GMBH, Hannover (DE)

(72) Inventor: Georges Maguin, Marly (FR)

(73) Assignee: Continental Automotive GmbH, Hannover (DE)

( * ) Notice: Subject to any disclaimer, the term of this patent is extended or adjusted under 35 U.S.C. 154(b) by 130 days.

(21) Appl. No.: 15/100,084

(22) PCT Filed: Nov. 26, 2014

(86) PCT No.: PCT/EP2014/075623

§ 371 (c)(1),
(2) Date: May 27, 2016

(87) PCT Pub. No.: WO2015/078894

PCT Pub. Date: Jun. 4, 2015

(65) Prior Publication Data

US 2017/0037762 A1 Feb. 9, 2017

(30) Foreign Application Priority Data

Nov. 28, 2013 (DE) ........................ 10 2013 113 155

(51) Int. Cl.

| | |
|---|---|
| ***F01N 3/28*** | (2006.01) |
| ***B01D 35/027*** | (2006.01) |
| ***B01D 29/00*** | (2006.01) |

(52) U.S. Cl.
CPC ....... *F01N 3/2896* (2013.01); *B01D 29/0093* (2013.01); *B01D 35/0273* (2013.01); *F01N 2610/02* (2013.01); *F01N 2610/1426* (2013.01)

(58) Field of Classification Search
CPC ............ B01D 29/0093; B01D 35/0273; F01N 2610/02; F01N 2610/1426; F01N 3/2896
(Continued)

(56) References Cited

U.S. PATENT DOCUMENTS 3,371,793 A 3/1968 Fowler
5,458,719 A 10/1995 Pall et al.
(Continued)

FOREIGN PATENT DOCUMENTS

CN 1576566 A 2/2005
DE 1536800 A1 3/1971
(Continued)

OTHER PUBLICATIONS

"Database WPI Week 201282", Thomson Scientific London, GB: AN 2012-Q85929, XP-002736435 X.

*Primary Examiner* — Phutthiwat Wongwian
*Assistant Examiner* — Diem T Tran
(74) *Attorney, Agent, or Firm* — Laurence A. Greenberg; Werner H. Stemer; Ralph E. Locher

(57) ABSTRACT

A multi-layer liquid purification element includes a liquid-permeable top layer and a liquid-impermeable base layer. The base layer has a suction port for drawing-in liquid through the liquid purification element. At least the top layer and the base layer are connected to one another by a liquid-impermeable connection. At least one separate insert is disposed between the top layer and the base layer. A method for producing a liquid purification element, a device for extracting a liquid additive for exhaust-gas purification from a tank and a motor vehicle are also provided.

9 Claims, 3 Drawing Sheets

(58) Field of Classification Search
USPC .......................................... 60/286, 301, 303
See application file for complete search history.

(56) References Cited

U.S. PATENT DOCUMENTS

| | | | | |
|---|---|---|---|---|
| 5,798,048 | A * | 8/1998 | Ries | F02M 37/22 210/243 |
| 5,804,280 | A * | 9/1998 | Pall | B01D 39/1692 156/155 |
| 7,029,582 | B2 * | 4/2006 | Sato | B01D 35/0273 210/232 |
| 7,845,500 | B2 | 12/2010 | Hueppchen et al. | |
| 9,127,583 | B2 * | 9/2015 | Hodgson | F01N 3/2066 |
| 2009/0266756 | A1 | 10/2009 | Fischer-Fruehholz et al. | |
| 2011/0024348 | A1 | 2/2011 | Meyer-Blumenroth et al. | |
| 2011/0056961 | A1 * | 3/2011 | Amtmann | F01N 3/2066 220/592.01 |
| 2016/0108872 | A1 | 4/2016 | Akagi et al. | |

FOREIGN PATENT DOCUMENTS

| | | | |
|---|---|---|---|
| DE | 202009005500 | U1 | 7/2009 |
| EP | 1685889 | B1 | 8/2006 |
| EP | 2283907 | A1 | 2/2011 |
| JP | 2012251481 | A | 12/2012 |
| RU | 2082483 | C1 | 6/1997 |
| RU | 2156153 | C2 | 9/2000 |
| WO | 9609879 | A1 | 4/1996 |
| WO | 2009127345 | A1 | 10/2009 |
| WO | 2012165165 | A1 | 12/2012 |

* cited by examiner

LIQUID PURIFICATION ELEMENT

BACKGROUND OF THE INVENTION

Field of the Invention

The invention relates to a liquid purification element for purifying a liquid. The liquid purification element is in particular suitable for filtering, and removing impurities from, a liquid additive for exhaust-gas purification (in particular a urea-water solution).

The liquid purification element may for example be used in a motor vehicle on a device for the extraction of a liquid additive from a tank. Liquid additives are used in motor vehicles for example for exhaust-gas purification, in order to reduce the nitrogen oxide compounds in the exhaust gas of an internal combustion engine. This is referred to as the "method of selective catalytic reduction" (SCR method). In the SCR method, urea-water solution is normally used as liquid additive. A 32.5% urea-water solution for exhaust-gas purification is available under the trade name AdBlue®. To carry out the SCR method, the urea-water solution is converted into ammonia. The nitrogen oxide compounds in the exhaust gas then react with the ammonia to form non-hazardous substances, such as $CO_2$, $H_2O$ and $N_2$.

A problem with the supply of liquid additive from a tank is that additives may often contain impurities. Impurities in urea-water solution are in particular particles that have passed into the tank during a tank filling process. A further group of impurities are crystalline urea deposits.

Said impurities can damage a device for the extraction and delivery of the liquid additive. Impurities in the liquid additive may also cause problems in the exhaust-gas treatment device. This is the case in particular if the impurities are solid (non-dissolvable) particles. Such impurities may have an abrasive effect in an exhaust-gas treatment device, and cause increased wear therein.

Against this background, it is advantageous to use a liquid purification element by means of which the liquid additive is filtered or purified before it passes into a device for the extraction, delivery and supply of the liquid additive.

A problem with a liquid purification element of said type is that it can become blocked. It is therefore advantageous for a liquid purification element to be exchangeable and restorable. Furthermore, the liquid purification element should be capable of operating for as long a period of time as possible without becoming blocked.

BRIEF SUMMARY OF THE INVENTION

Taking this as a starting point, it is an object of the present invention to solve or at least alleviate the technical problems highlighted in connection with the prior art. It is sought in particular to specify a particularly advantageous liquid purification element which is suitable in particular for the purification of liquid additive for exhaust-gas purification (such as urea-water solution).

Said objects are achieved by means of a liquid purification element according to the features recited below. Further advantageous embodiments of the liquid purification element are specified in the dependent claims. The features specified individually in the claims may be combined with one another in any desired technologically meaningful way and may be supplemented by explanatory facts from the description, with further embodiments of the invention being specified.

Accordingly, there is proposed a multi-layer liquid purification element having a liquid-permeable top layer and having a liquid-impermeable base layer, wherein the base layer has a suction port for the drawing-in of liquid through the liquid purification element, and at least the top layer and the base layer are connected to one another by means of a liquid-impermeable connection, wherein, between the top layer and the base layer, there is arranged at least one separate insert.

The liquid purification element constitutes a substantially areal element which has a thickness significantly smaller than the maximum areal extent along the top layer or along the base layer. The liquid purification element is preferably flexible, that is to say can be (plastically and/or elastically) deformed and in particular bent. The liquid purification element may in particular be adapted to the surface of a housing or to the surface of a tank, wherein said liquid purification element either maintains said shape in a dimensionally stable manner and/or is guided in corresponding holders. The liquid purification element can also be deformed if freezing of the liquid occurs. It can also expand if the liquid freezes (and therefore itself expands) inside the liquid purification element.

The liquid purification element is suitable for liquid to be drawn in through the (preferably single) suction port. The suction port may be in the form of a (single) opening in the base layer, if appropriate with a protruding attachment connector (for example in the manner of a cylindrical projection). Furthermore, the base layer is not permeable to the liquid, such that said liquid is delivered in a targeted manner only via the suction port (or else a multiplicity of suction ports, said number preferably being limited to 2, 3 or 4). The liquid can pass through the liquid-permeable top layer (which in particular covers a large area) into the liquid purification element, and can subsequently flow between the top layer and the base layer (also) to the suction port. It is preferable if, for this purpose, there is an areal connecting chamber between the top layer and the base layer. The liquid purification element is preferably configured such that a liquid-permeable flow path to the suction port exists from every location in the top layer. In a preferred embodiment the suction port is positioned close to the liquid-impermeable connection. Preferably the suction port is arranged with a distance to the liquid-impermeably connection of less than two centimeters (2 cm), in particular preferred less than one centimeter (1 cm). In case the liquid purification element is placed in the tank, the suction port is preferably positioned at an upper part of the liquid purification element. As a consequence, the liquid is sucked through the liquid purification element towards the suction port from the bottom to the top. Preferably, the liquid purification element has a selective permeability for a particular liquid. In particular, it is advantageous that the liquid purification element has a high permeability regarding urea-water solution and a low permeability regarding air. Such a selective permeability can be provided by at least one of the layers of the liquid purification element. The selective permeability allows to provide the liquid at the suction port in high-purity form, even if the surface of the top layer is only partially wetted with the liquid. In particular, it is possible to provide urea-water solution (almost) without (interfering) air bubbles at the suction port if the liquid is urea water solution, even in case that the surface of the top layer is only partially wetted with urea-water solution.

The liquid-permeable top layer may for example be formed by a perforated foil material and/or by a flexible grid. The liquid-permeable top layer preferably comprises a polymer material. The liquid-permeable top layer may however also be composed of a metallic material.

The liquid-impermeable base layer is preferably formed from a foil material and/or from a flexible plate. The liquid-impermeable base layer preferably likewise comprises a polymer material; said base layer may however also be composed of a metallic material.

The liquid-permeable top layer and the liquid-impermeable base layer are preferably manufactured from the same material. In any case, for usage with a urea-water solution, corresponding resistance and if appropriate also a certain degree of "flexibility" in the case of ice pressure being generated in the event of freezing are (in each case) advantageous.

The liquid-impermeable connection is preferably formed by an encircling connecting seam that connects the top layer and the base layer to one another. Here, the expression "encircling" means in particular that the connection forms a closed linear portion on the multi-layer, flexible liquid purification element. The liquid-impermeable connection encircles in particular a location on the liquid purification element at which the suction port is provided.

The multi-layer liquid purification element has at least one additional, separate insert which is arranged between the top layer and the base layer. Said additional, separate insert may perform a liquid purification function in order to ensure particularly effective purification of the liquid. It is preferable for the at least one separate insert to be connected to the top layer and to the base layer in the liquid-impermeable connection. Furthermore, the additional, separate insert may be configured or selected such that it maintains the presence of the connecting chamber between the top layer and the base layer even in the event of a deformation of the liquid purification element, and/or to realize at least one targeted flow path from the top layer to the suction port.

The liquid purification element is particularly advantageous if the at least one separate insert comprises at least one filter layer.

It is also particularly advantageous for the filter layer to comprise a nonwoven material.

With a filter layer, it is possible for particles to constantly be filtered out of the liquid. The filter layer preferably has a depth filter characteristic. This means, that impurities in the liquid are deposited within the filter layer and do not merely remain on a surface of the filter layer. This distinguishes a filter layer for example from a screen which normally exhibits only limited permeability to particularly large impurities, such that said impurities are deposited on a surface of the screen. A filter layer may for example be constructed from a nonwoven material which is composed of polymer fibres and which is produced for example by pressing and/or sintering. In the case of a nonwoven, the fibres may be in a chaotic and/or ordered arrangement, such that said expression in this case also encompasses, in particular, fabrics and the like. The filter layer may also be (partly) produced by a spraying process, wherein filter fibres are spun and sprayed on a substrate.

It is also advantageous if the at least one separate insert comprises at least one support layer.

Here, a support layer refers in particular to a structure which does not exhibit a purification action or filtering action for the particles that are normally present in the liquid, said structure rather having the task of ensuring the presence of an areal connecting chamber between the top layer and the base layer, and in particular between a filter layer and the base layer, in order that a free flow of the liquid to the suction port is possible from every location in the liquid purification element. For this purpose, the support layer preferably exhibits an "open" porosity significantly larger than a porosity of a filter layer of the liquid purification element. The support layer prevents collapsing of the liquid purification element in case a pump is connected to the suction port and this pump is operated for extracting liquid from the tank wherein it constitutes a negative pressure at the suction port. For this purpose, the support layer preferably has a lower compressibility than the filter layer so that it is not (or only marginally) compressed by the negative pressure.

It is also preferable for multiple separate inserts to be provided which, separately, realize in each case a liquid purification function and a supporting function.

Here, the design may be configured such that a filter layer is firstly provided below the top layer, and the support layer is provided below said filter layer, wherein said support layer then adjoins the base layer.

The liquid purification element is particularly advantageous if at least two support layers having aligned passages are provided, wherein the passages of the at least two support layers are oriented in different directions and the passages of the at least two support layers overlap with one another such that an areal duct system is formed.

Said two support layers may for example comprise metallic and/or polymer foil materials which have in each case an oriented and/or mutually coordinated pattern with slots. Said slots preferably form embodiments of the described passages. The passages of the two support layers preferably (partially) overlap one another. Furthermore, the passages of the two support layers lying one on top of the other are preferably oriented such that an areal duct system is formed which forms the areal connecting chamber described further above. This means in particular that one part of the duct system is formed by the first support layer and a further part is formed by the further support layer, and the liquid flows through the filter layer multiple times and/or at different locations as it flows through the duct system to the suction port.

It is also advantageous for the support layer to comprise a stretched material.

A stretched material is produced by virtue of a pattern of overlapping slots arranged parallel to one another being formed into a sheet-metal starting material. The stretched material is subsequently stretched in a direction perpendicular to the overlapping slots. Thus, passages are formed in each case in the sheet-metal starting material, and at the same time, the overall area of the material increases, wherein here, an overall area refers to the area of the starting material and additionally the area of the passages. In one embodiment, the stretched material is metallic (so-called stretched metal). It is also possible for a polymer material (for example a foil) to be processed as a stretched material.

It is particularly advantageous for two different support layers composed of stretched material to be arranged within the liquid purification element, which support layers—as described further above—are arranged such that the slots or passages that exist in the individual support layers are oriented in different directions and overlap, such that the described areal duct system is formed.

In particular, it is possible for two stretched materials with differently oriented passages to be used as support layers.

The at least one support layer may also have a (protruding) embossment, by means of which a thickness of the support layer is increased. This makes it possible, with the at least one support layer, to provide a connecting chamber which is of larger volume and which exhibits increased permeability. An embossment may for example be formed in the manner of a corrugation. An embossment may in particular also be provided on a stretched material.

Furthermore, the liquid purification element is advantageous if the suction port is formed by an opening in the base layer with a cylindrical projection.

By way of the suction port, the liquid purification element can be connected to an extraction port on a device for the extraction and/or delivery of a liquid. It is particularly advantageous for the opening to be punched or similar out of the material of the base layer, and for the cylindrical projection to be adhesively bonded or welded to the base layer. The cylindrical projection is preferably manufactured from a polymer material.

Furthermore, the liquid purification element is advantageous if the connection is formed with a weld seam by means of which at least the top layer and the base layer are connected to one another.

It is also particularly preferable for the at least one separate insert (preferably all of the separate inserts) to be connected via said weld seam to the top layer and/or to the base layer. It is also particularly preferable for both the top layer and also the base layer to be composed of a polymer foil material. The welded connection may be produced for example by means of a roller seam welding process in which a hot body that generates the welding action is moved along the liquid-impermeable connection over the top layer and over the base layer in order to connect the top layer and the base layer to one another in the region of the liquid-impermeable connection. It is preferable for a separate insert that is arranged between the top layer and the base layer to likewise be connected to the top layer and/or to the base layer during the welding process. The separate insert thus preferably has material properties suitable for simultaneous welding to the top layer and to the base layer.

A welding process is not the only possibility for forming a liquid-impermeable connection on the liquid purification element. The liquid-impermeable connection may for example also comprise an adhesive connection and/or a clamped connection. It is likewise possible for different connecting techniques (welding, adhesive bonding, clamping, etc.) to be combined with one another to form the liquid-impermeable connection.

It is also the intention here to describe a production method for a liquid purification element, having at least the following steps:

a) providing a liquid-permeable top layer;
b) providing a liquid-impermeable base layer;
c) providing at least one separate insert;
d) forming a liquid-impermeable connection of at least the top layer and the base layer; and
e) forming a suction port on the base layer.

The described production method is particularly suitable for producing a liquid purification element as proposed here. All of the advantages and special technical design features described further above in conjunction with the liquid purification element can be transferred analogously to the production method. The same applies to the special advantages and design features of the production method highlighted below, which can be transferred analogously to the liquid purification element. The sequence of the method steps a) to e) is not binding. If technically expedient, the sequence of method steps a) to e) may be changed. It is likewise possible, if appropriate, for the method steps to be performed (at least partially) simultaneously.

With this production method, it is possible in particular to produce a large number of liquid purification elements from starting materials for the top layer, the base layer and the at least one further layer. Here, the starting materials may be provided in each case in the form of material strips (for example in the form of coils). The starting materials are laid one on top of the other, and the liquid-impermeable connections are subsequently produced. Then, an additional step is required in which in each case one portion of the starting material for the top layer, the base layer and the at least one separate insert is severed. Said severing step may be performed before or after step d) or before or after step e). The severing may be performed for example by cutting or punching.

In one particularly preferred implementation variant of the described method, liquid-impermeable connections for a multiplicity of liquid purification elements are provided in step d), which connections are provided adjacent to one another and/or one behind the other on starting materials for the top layer, the base layer and the separate insert. The individual liquid purification elements are subsequently separated from one another. The described method also makes it possible in particular for liquid purification elements of different surface area or different size to be produced from common starting materials.

Furthermore, step e) may be performed in two sub-steps: Accordingly, in step e.1), an opening can be formed into the top layer, and in step e.2), a projection can be joined on. Step e.1) may for example be performed before step d), while step e.1) may if appropriate (also) be performed after and/or (partially) at the same time as step d).

Also proposed is a device for the extraction of a liquid additive for exhaust-gas purification from a tank, having a housing for installation in the tank, the housing having an extraction port to which a liquid purification element proposed here is connected by way of the suction port, wherein the device is suitable, and set up, for extracting liquid additive, in particular urea-water solution, from the tank through the liquid purification element.

The housing preferably constitutes an encapsulation of the device. The device and the housing of the device are formed such that the device can be inserted into an opening in a tank wall of a tank, and in particular into an opening in a tank base. Then, one portion of the housing is oriented toward an interior of the tank, whereas a further portion of the housing is oriented toward an outer side of the tank. It is preferable for a supply port, via which the device can supply liquid to a consumer, to be situated on the portion of the housing on the outer side of the tank. The extraction port already described is oriented toward the interior of the tank. The described liquid purification element is formed at said extraction port. The liquid purification element is preferably adapted to an external shape of the housing and lies against the housing. For this reason, it is particularly advantageous for the liquid purification element to be flexible. The liquid purification element can then be bent around a portion of the housing. The liquid purification element may be adhesively bonded or welded to the housing. It is also possible for the liquid purification element to be inserted into a receptacle on the housing. Furthermore, there may also be provided a cover element by means of which the liquid purification element is fixed to the housing. It is preferable for a line to extend within the housing from the extraction port to the supply port, through which line the liquid additive can be delivered. On said line there is arranged a pump which performs the delivery and if appropriate also the dosing of the liquid additive.

The configuration described above having a receptacle and the cover element represents only one example of an assembling of the liquid purification element. According to a further embodiment, it is also possible that the liquid purification element is (only) welded to the housing. It is also possible that the liquid purification element is not large-area connected to a housing but only at the suction port via a locally fixation, so that the liquid purification element can be arranged freely movable and/or flexible inside the tank, for example. For example, it is possible that the liquid purification element or a plurality of liquid purification elements comprises projecting arms which extend from an housing of the device for extraction of a liquid into the tank. The liquid purification element can therefore be used in many different applications.

The liquid purification element of the device is preferably exchangeable. The suction port of the liquid purification element may be adhesively bonded to, plugged onto or connected by means of a welded connection to the extraction port of the device.

The invention is used in particular in a motor vehicle having an internal combustion engine, an exhaust-gas treatment device for the purification of the exhaust gases of the internal combustion engine, a tank for storing a liquid additive, and the device described here for the extraction of the liquid additive from the tank and for the supply of the liquid additive to the exhaust-gas treatment device.

In the exhaust-gas treatment device there is preferably arranged an SCR catalytic converter by means of which the exhaust-gas purification method of selective catalytic reduction can be carried out. The liquid additive for the SCR method (in particular urea-water solution) can be supplied to the exhaust-gas treatment device preferably by means of an injector that is connected to the device via a line.

BRIEF DESCRIPTION OF THE SEVERAL VIEWS OF THE DRAWING

The invention and the technical field will be explained in more detail below on the basis of the figures. It is pointed out that the special exemplary embodiments and features illustrated in the figures, and in particular the proportions illustrated in the figures, are merely schematic. In the figures.

DESCRIPTION OF THE INVENTION

Figure 1:
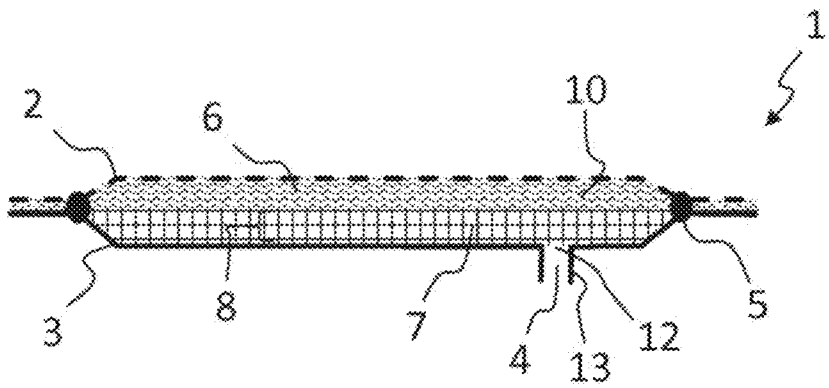
FIG. 1: shows a first embodiment of a liquid purification element.
Figure 2:
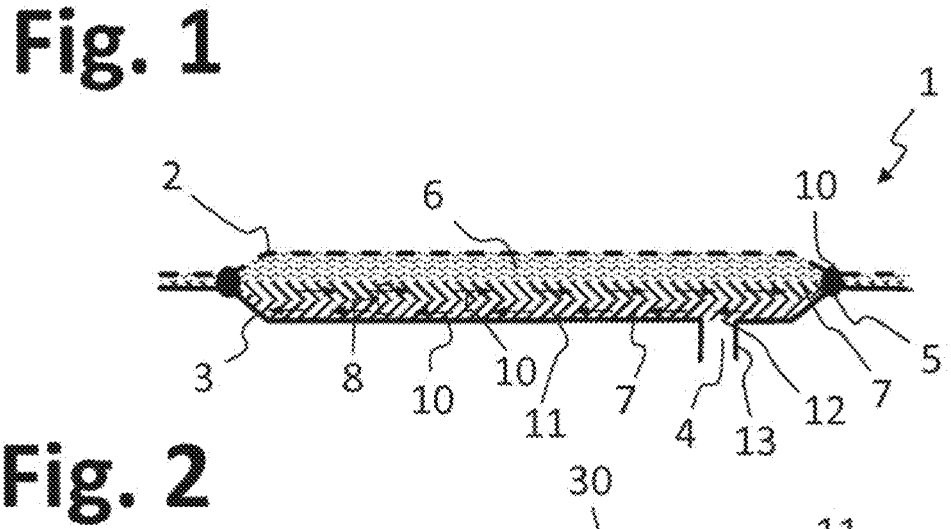
FIG. 2: shows a second embodiment of a liquid purification element.

FIGS. 1 and 2 illustrate in each case a liquid purification element 1 which has a base layer 3 and a top layer 2 which are connected to one another by means of an encircling connection 5 (which forms, for example, a form of quadrangle). The top layer 2 is (preferably entirely or predominantly) permeable to liquid (in the region within the connection) in order that liquid can be drawn into the liquid purification element 1. The base layer 3 has a (single) suction port 4 to which an extraction port of a device for the extraction and delivery of liquid additive from a tank can be connected. The suction port 4 is preferably formed by an opening 12 in the base layer 3 and by a cylindrical projection 13 on the base layer 3. Between the top layer 2 and the base layer 3 there is preferably situated a (single) filter layer 6 by means of which the liquid passing through the top layer 2 into the liquid purification element 1 can be purified. Between the filter layer 6 and the base layer 3 there is preferably arranged (at least) one support layer 7 which ensures the presence of an areal connecting chamber 8 between the filter layer 6 and the base layer 3, which connecting chamber ensures that liquid can flow to the suction port 4 from every location of the filter layer 6 or of the top layer 2. Both the filter layer 6 and also the support layer 7 are labelled as separate inserts in the liquid purification element 1.

In the embodiment as per FIG. 1, there is exactly one support layer 7 which may be formed for example by an (extremely) open-pored material (which, for the usage situation, has practically no filtering action). In the embodiment as per FIG. 2, two support layers 7 are provided, through which flow can pass in different directions 10 in each case and which thus form an areal duct system 11 which forms the described connecting chamber 8. In both cases, the liquid flows through the components of the liquid purification element in the following sequence: top layer 2, filter layer 6, support layer(s) 7 and base layer 3.

Figure 3:
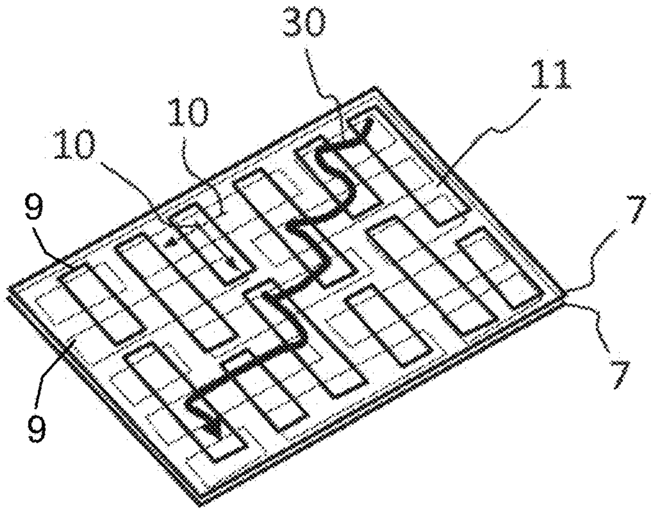
FIG. 3: shows a construction of the liquid purification element with two support layers.

A construction with two support layers (as indicated for example in FIG. 2) is explained once again in more detail in FIG. 3, wherein the two support layers 7, which each have passages 9, are illustrated three-dimensionally. Said passages 9 in the individual support layers 7 are oriented in each case in different directions 10 and overlap or intersect with one another in each case. A duct system 11 is thus formed which in turn ensures the presence of the described connecting chamber within the liquid purification element 1. This permits a liquid flow 30 to the suction port (not illustrated in FIG. 3) on the base layer from every location in the support layers 7, such that the top layer (not illustrated here) and/or the filter layer (not illustrated here) can be connected, in large-area form, to the suction port. Here, the expression "large-area" means that the entire area of the top layer and of the filter layer (within the liquid-impermeable connection) is connected in liquid-conducting fashion to the suction port.

Figure 4:
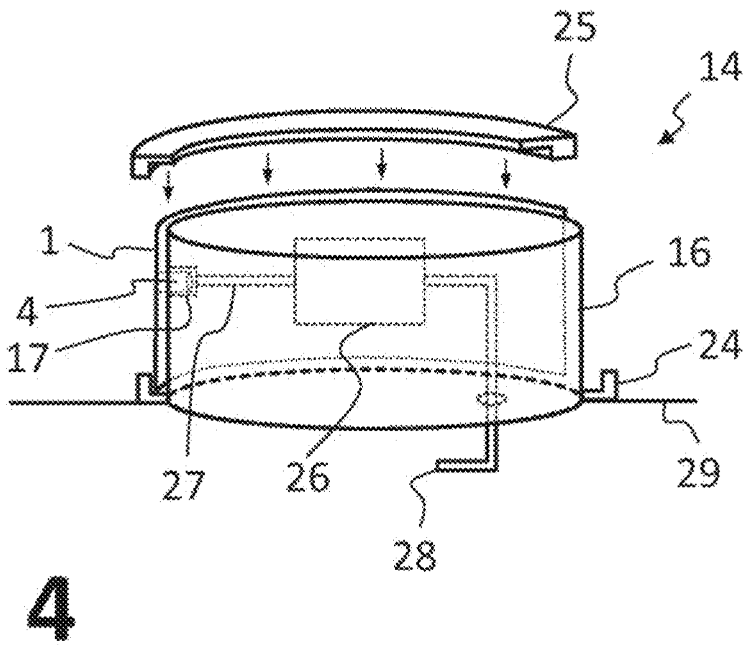
FIG. 4: shows a device for the extraction of a liquid additive from a tank with a liquid purification element.

FIG. 4 shows a device 14 for the extraction of a liquid additive for exhaust-gas purification (in particular urea-water solution) from the tank. In FIG. 4, (only) the tank bottom 29 into which the device 14 or the housing 16 of the device 14 is inserted is illustrated. On the housing 16 there is provided an extraction port 17 through which liquid can be drawn out of the tank. The suction port 4 of a described liquid purification element is connected to the extraction port 17 such that liquid can be drawn through the liquid purification element 1 into the extraction port 17. A suction line 27 runs from the extraction port 17 to a pump 26 arranged in the housing 16. The liquid delivered by the pump 26 is supplied by the device 14 at the supply port 28. The liquid purification element 1 is arranged on the device 14 in a receptacle 24 and is adapted to an outer surface of the housing 16. Furthermore, a cover element 25 may be provided which permanently fixes the liquid purification element to the housing 16 or to the outer surface of the housing 16.

Figure 5:
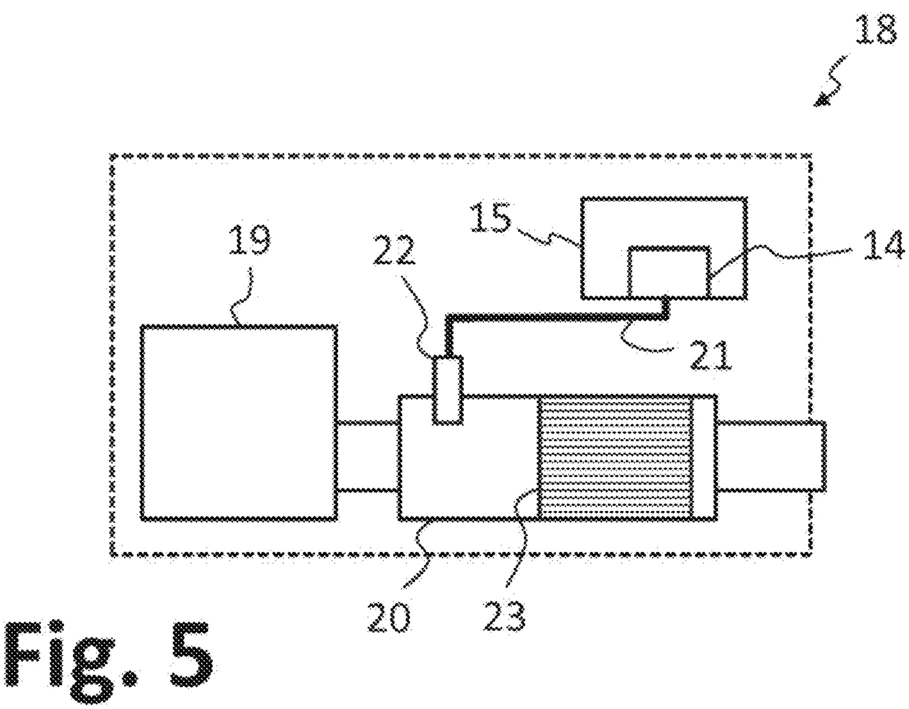
FIG. 5: shows a motor vehicle having a device for the extraction of a liquid additive from a tank.

FIG. 5 shows a motor vehicle 18 having an internal combustion engine 19 and having an exhaust-gas treatment device 20 for the purification of the exhaust gases of the internal combustion engine 19. In the exhaust-gas treatment device 20 there is provided an SCR catalytic converter 23 for carrying out the method of selective catalytic reduction. Liquid additive can be supplied from a tank 15 to the exhaust-gas treatment device 20 via an injector 22 and a line 21 by a device 14.

Figure 6:
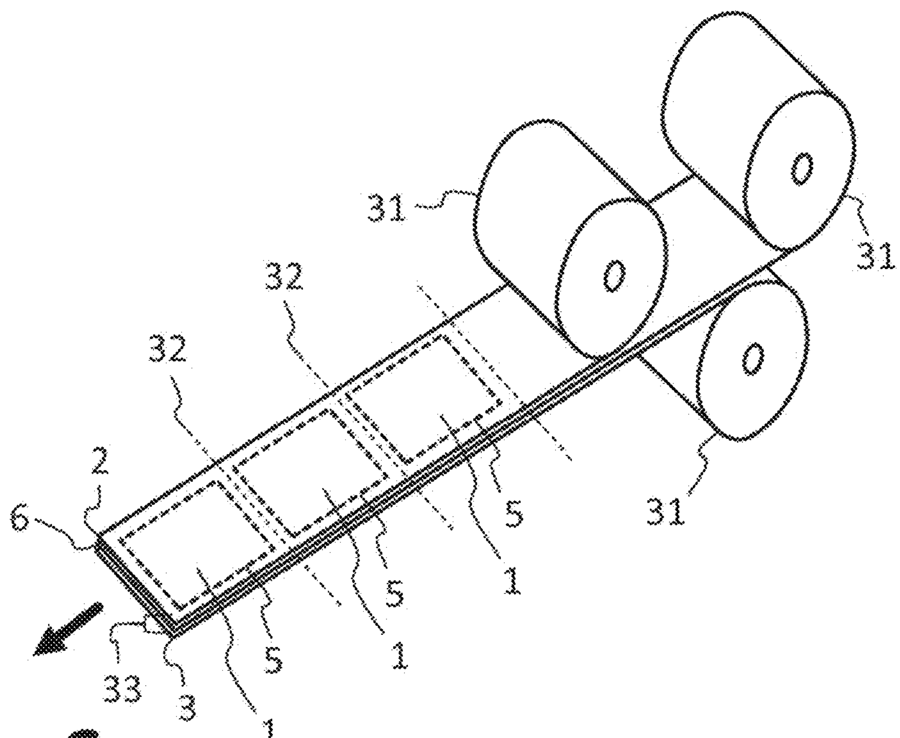
FIG. 6: illustrates a method for the production of the liquid purification element.

FIG. 6 shows a stage during a production process for the production of liquid purification elements 1. It can be seen in FIG. 6 that the top layer 2, the base layer 3 and a filter layer 6 are provided in each case in the form of an endless material strip from a coil 31. The filter layer 6 illustrated here is to be understood as an example for any desired separate insert. A support layer, for example, may additionally or alternatively also be provided between the top layer 2 and the base layer 3. The top layer 2, the filter layer 6 and the base layer 3 form a layer pack 33 which can be severed along cut lines 32 to form liquid purification elements 1. The liquid-impermeable connections 5 that delimit the individual liquid purification elements 1 may be produced before or after the severing of the individual liquid purification elements 1 along the cut lines 32.

By way of precaution, it is also pointed out that the combinations of technical features shown in the figures are not generally imperative. For example, technical features from one figure may be combined with other technical features from another figure and/or from the general description. The only exception to this is if the combination of features has been explicitly referred to here and/or a person skilled in the art identifies that the basic functions of the device can no longer be realized otherwise.

LIST OF REFERENCE NUMERALS

1 Liquid purification element
2 Top layer
3 Base layer
4 Suction port
5 Connection
6 Filter layer
7 Support layer
8 Connecting chamber
9 Passage
10 Direction
11 Duct system
12 Opening
13 Cylindrical projection
14 Device
15 Tank
16 Housing
17 Extraction port
18 Motor vehicle
19 Internal combustion engine
20 Exhaust-gas treatment device
21 Line
22 Injector
23 SCR catalytic converter
24 Receptacle
25 Cover element
26 Pump
27 Suction line
28 Supply port
29 Tank bottom
30 Liquid flow
31 Coil
32 Cut line
33 Layer pack

The invention claimed is:

1. A multi-layer liquid purification element, comprising:
a liquid-permeable top layer;
a liquid-impermeable base layer having a suction port for drawing-in liquid through the liquid purification element;
a liquid-impermeable connection interconnecting at least said top layer and said base layer;
a filter layer disposed between said top layer and said base layer; and
two support layers being provided below said filter layer and having aligned passages, said aligned passages overlapping one another for defining an areal duct system.

2. The liquid purification element according to claim 1, wherein said filter layer includes a nonwoven material.

3. A multi-layer liquid purification element, comprising:
a liquid-permeable top layer;
a liquid-impermeable base layer having a suction port for drawing-in liquid through the liquid purification element;
a liquid-impermeable connection interconnecting at least said top layer and said base layer; and
at least one separate insert disposed between said top layer and said base layer, said at least one separate insert including at least one support layer, said at least one support layer including at least two support layers having aligned passages, said passages of said at least two support layers being oriented in different directions and said passages of said at least two support layers overlapping one another to form an areal duct system.

4. The liquid purification element according to claim 1, wherein at least one of said support layers includes a stretched material.

5. The liquid purification element according to claim 1, wherein said suction port is formed by an opening in said base layer having a cylindrical projection.

6. The liquid purification element according to claim 1, wherein said connection is formed with a weld seam interconnecting at least said top layer and said base layer.

7. A method for producing a liquid purification element, the method comprising the following steps:
a) providing a liquid-permeable top layer;
b) providing a liquid-impermeable base layer;
c) providing a filter layer between the top layer and the base layer;
d) forming a liquid-impermeable connection of at least the top layer and the base layer;
e) forming a suction port on the base layer for drawing-in liquid through the liquid purification element; and
f) providing two support layers below said filter layer and having aligned passages, the aligned passages overlapping one another for defining an areal duct system.

8. A device for extracting a liquid additive for exhaust-gas purification from a tank, the device comprising:
a liquid purification element according to claim 1; and
a housing to be installed in the tank, said housing having an extraction port connected to said suction port of said liquid purification element permitting the device to extract liquid additive from the tank through said liquid purification element.

9. A motor vehicle, comprising:
an internal combustion engine;
an exhaust-gas treatment device for the purification of exhaust gases of said internal combustion engine;
a tank for storing a liquid additive; and
a device according to claim 8 for extracting the liquid additive from the tank and for supplying the liquid additive to said exhaust-gas treatment device.

* * * * *